United States Patent
Buist et al.

(10) Patent No.: US 6,484,487 B1
(45) Date of Patent: Nov. 26, 2002

(54) PLANT ENGAGING SYSTEMS AND METHODS FOR HARVESTING MACHINES

(75) Inventors: Kenneth J. Buist, Lynden, WA (US); Thomas Vander Wilt, Lynden, WA (US)

(73) Assignee: Korvan Industries, Inc., Lynden, WA (US)

( * ) Notice: Subject to any disclaimer, the term of this patent is extended or adjusted under 35 U.S.C. 154(b) by 0 days.

(21) Appl. No.: 09/654,590

(22) Filed: Sep. 1, 2000

Related U.S. Application Data

(60) Provisional application No. 60/168,837, filed on Dec. 3, 1999.

(51) Int. Cl.$^7$ ................................................ A01D 46/28
(52) U.S. Cl. ...................................................... 56/330
(58) Field of Search ........................... 56/327.1, 328.1, 56/330, 331, 12.7, 233, 339, 29, 340.1, DIG. 19

(56) References Cited

U.S. PATENT DOCUMENTS

| | | |
|---|---|---|
| 1,323,928 A | 12/1919 | Tervo |
| 1,629,831 A | 5/1927 | Maglathlin |
| 1,725,382 A | 8/1929 | Trufant |
| 2,671,301 A | 3/1954 | Harrison |
| 2,783,605 A | 3/1957 | Heleen |
| 3,455,406 A | 7/1969 | Soteropulos |
| 3,590,566 A | 7/1971 | Cutts, Sr. et al. |
| 3,672,140 A | 6/1972 | Furford |
| 4,141,203 A | 2/1979 | Keillor |
| 4,179,873 A | 12/1979 | Scudder |
| 4,286,426 A | 9/1981 | Orlando et al. |
| 4,292,792 A | 10/1981 | Burton |
| 4,299,081 A | 11/1981 | Harris et al. |
| 4,750,322 A | 6/1988 | Korthuis |
| 4,970,850 A | 11/1990 | DeVries |
| 4,972,662 A | 11/1990 | Korthuis et al. |
| 4,974,404 A | 12/1990 | Korthuis et al. |
| 4,976,094 A | 12/1990 | Williamson et al. |
| 4,982,559 A | 1/1991 | Calais |
| 5,027,593 A | 7/1991 | Korthuis et al. |
| 5,946,896 A | 9/1999 | Daniels |
| 6,070,402 A | 6/2000 | Korthuis et al. |

*Primary Examiner*—Robert E. Pezzuto
(74) *Attorney, Agent, or Firm*—Michael R. Schacht; Schacht Law Office, Inc.

(57) ABSTRACT

A plant engaging system comprising a rigid frame, a first drum assembly, a counterweight system, and a rotation system. The rigid frame assembly defines a reference axis. The first drum assembly comprises at least one drum member and at least one beater rod extending from the drum member. The drum member defines a first drum axis, and the first drum assembly is supported by the rigid frame such that the first drum axis is parallel to and spaced a first offset distance from the reference axis. The counterweight assembly has a center of gravity and is supported by the rigid frame such that the center of gravity is spaced a second offset distance from the reference axis. The rotation system causes the at least one drum member and the counterweight assembly to revolve around the reference axis. Revolution of the at least one drum member about the reference axis causes the beater rod to engage the plant to dislodge produce from the plant.

24 Claims, 9 Drawing Sheets

PLANT ENGAGING SYSTEMS AND METHODS FOR HARVESTING MACHINES

RELATED APPLICATIONS

This application claims priority of U.S. Provisional Patent Application Ser. No. 60/168,837, which was filed on Dec. 3, 1999.

TECHNICAL FIELD

The present invention relates generally to harvesting machines that use beater rods to harvest berries, fruits or other produce and, more particularly, to the drive system for moving the beater rods during harvesting.

BACKGROUND OF THE INVENTION

Harvesting machines are commonly used to harvest berries, fruits, and other produce of row crops. The individual plants, such as trees, vines, or bushes, of such crops are typically arranged in rows.

Conventional harvesting machines commonly comprise a chassis or carriage that travels along the rows on wheels. In some configurations, the carriage in the shape of an inverted "U" and straddles one row of the crop. In other arrangements, the entire chassis moves between two crop rows.

Conventionally, harvesting machines comprise beater rods that extend radially outwardly from a rotating hub. As the harvesting machine moves along the crop row, the beater rods rotate about the axis of the hub. In addition, an oscillating movement is often imparted to the beater rods. The resulting movement of the beater rods jostles or shakes the plant to remove the produce therefrom. The produce is then collected by a collecting system and carried by a conveyor to a collecting bin.

The present invention relates to a drive system for imparting movement to plants to dislodge produce. The present invention is of particular relevance when used to harvest produce that grows on trees, such as olives or oranges, and embodiments suited for those applications will be discussed in detail herein. The present invention may have application to the harvesting of produce of other crops, so the scope of the present invention should be determined by the claims appended hereto and not the detailed discussion presented below.

SUMMARY OF THE INVENTION

The present invention relates to a plant engaging system for harvesting produce from plants. In one form, the plant engaging system comprises a rigid frame, a first engaging assembly, a counterweight system, and a rotation system. The rigid frame assembly defines a reference axis. The first engaging assembly comprises at least one engaging member. The engaging member defines a first engaging axis, and the first engaging assembly is supported by the rigid frame such that the first engaging axis is parallel to and spaced a first offset distance from the reference axis. The counterweight assembly has a center of gravity and is supported by the rigid frame such that the center of gravity is spaced a second offset distance from the reference axis. The rotation system causes the at least one engaging member and the counterweight assembly to revolve around the reference axis. Revolution of the at least one engaging member about the reference axis engages the plant to dislodge produce from the plant. Often, but not necessarily, one or more beater rods are attached to the engaging member to impart the movement of the engaging assembly more deeply into the plant.

The present invention may also be embodied as a method of moving at least one engaging member such that the engaging member engages a plant and dislodges produce from the plant. The method comprises the steps of providing a rigid frame assembly defining a reference axis; providing at least one first engaging assembly comprising an engaging member; mounting the engaging member on the rigid frame assembly such that the engaging member revolves about the reference axis; mounting a counterweight assembly on the rigid frame assembly such that a center of gravity of the counterweight assembly revolves around the reference axis; and causing the engaging member and the counterweight assembly to revolve about the reference axis such that the at least one engaging member contacts the plant to dislodge produce from the plant. Again, one or more beater rods may be attached to the engaging member to impart the movement of the engaging assembly more deeply into the plant.

The present invention may also be embodied as a harvesting system for harvesting produce from a plant. In this case, the harvesting system comprises a vehicle platform capable of movement next to the plant, a vehicle frame extending from the vehicle platform, and at least one plant engaging system comprising a rigid frame assembly, a first engaging assembly, a counterweight assembly, and a rotation assembly. The revolution of an engaging member of the first engaging assembly about the reference axis while the vehicle platform moves by the plant causes the at least one engaging member to engage the plant to dislodge produce from the plant. In the context of a harvesting system or method, one or more beater rods may be attached to the engaging member to impart the movement of the engaging assembly more deeply into the plant.

DETAILED DISCUSSION OF THE PREFERRED EMBODIMENTS

Figure 1:
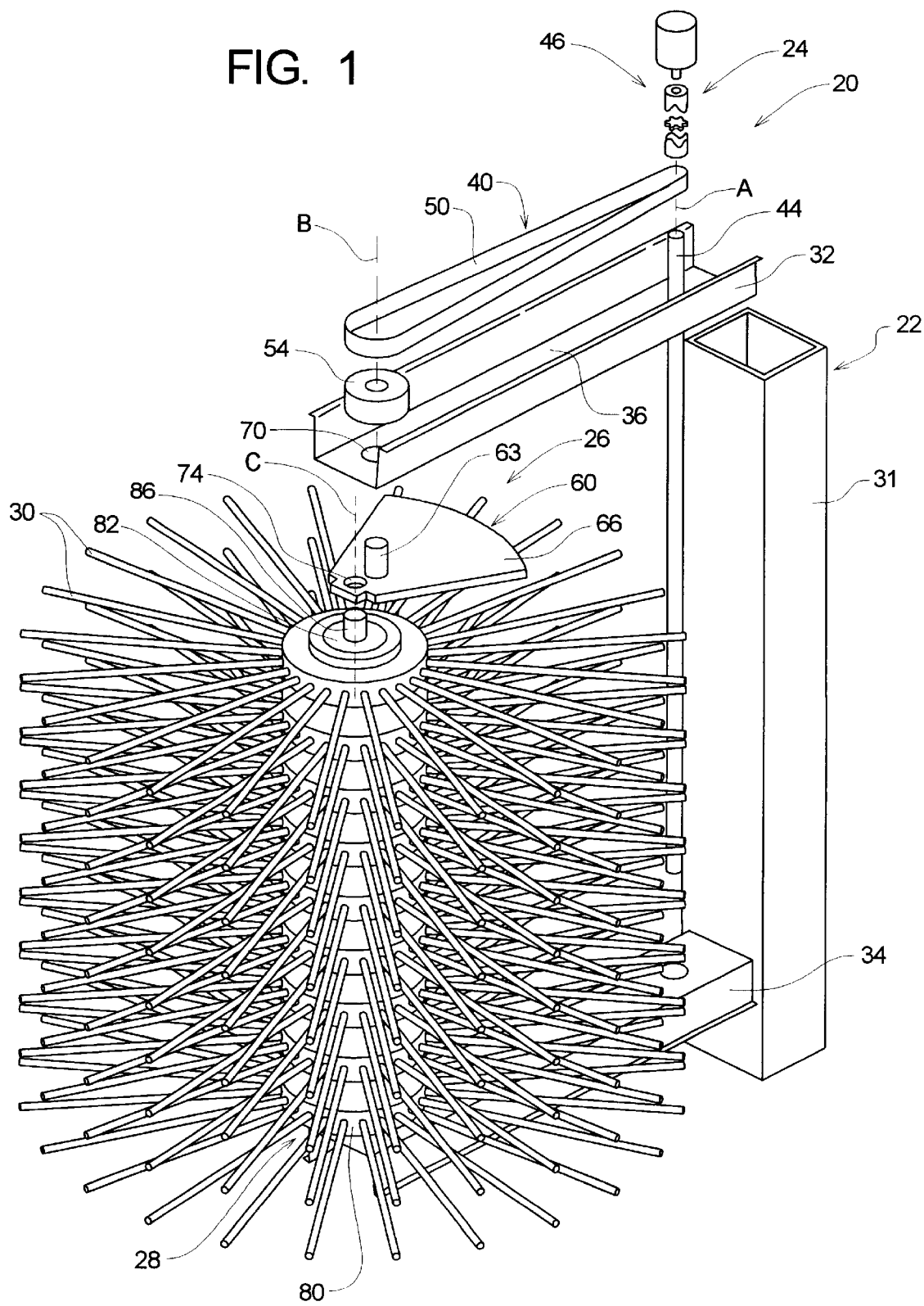
FIG. 1 is an upper, perspective, exploded view of a first embodiment of a plant engaging system of the present invention.
Figure 2:
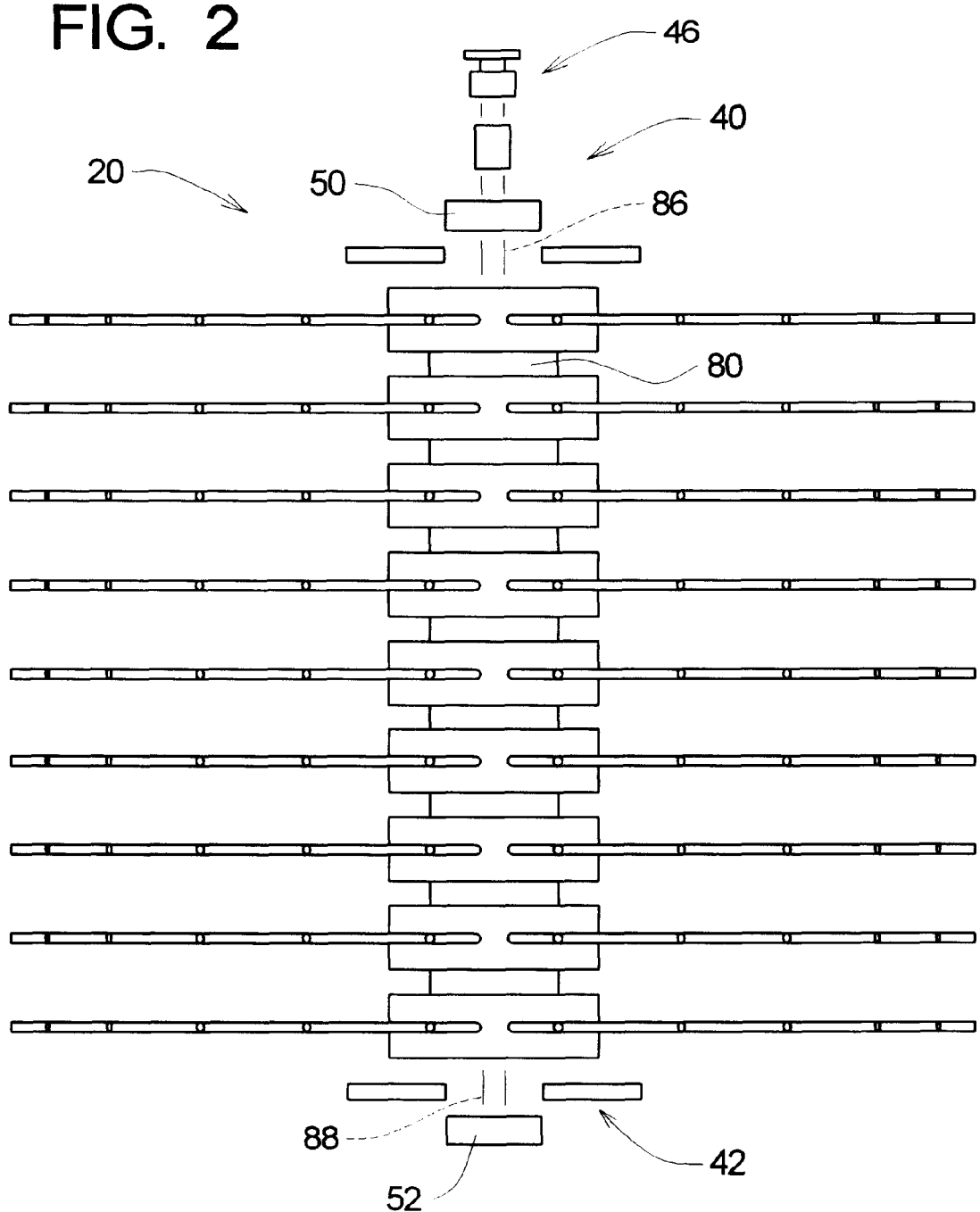
FIG. 2 is a front plan view of the plant engaging system of FIG. 1.
Figure 3:
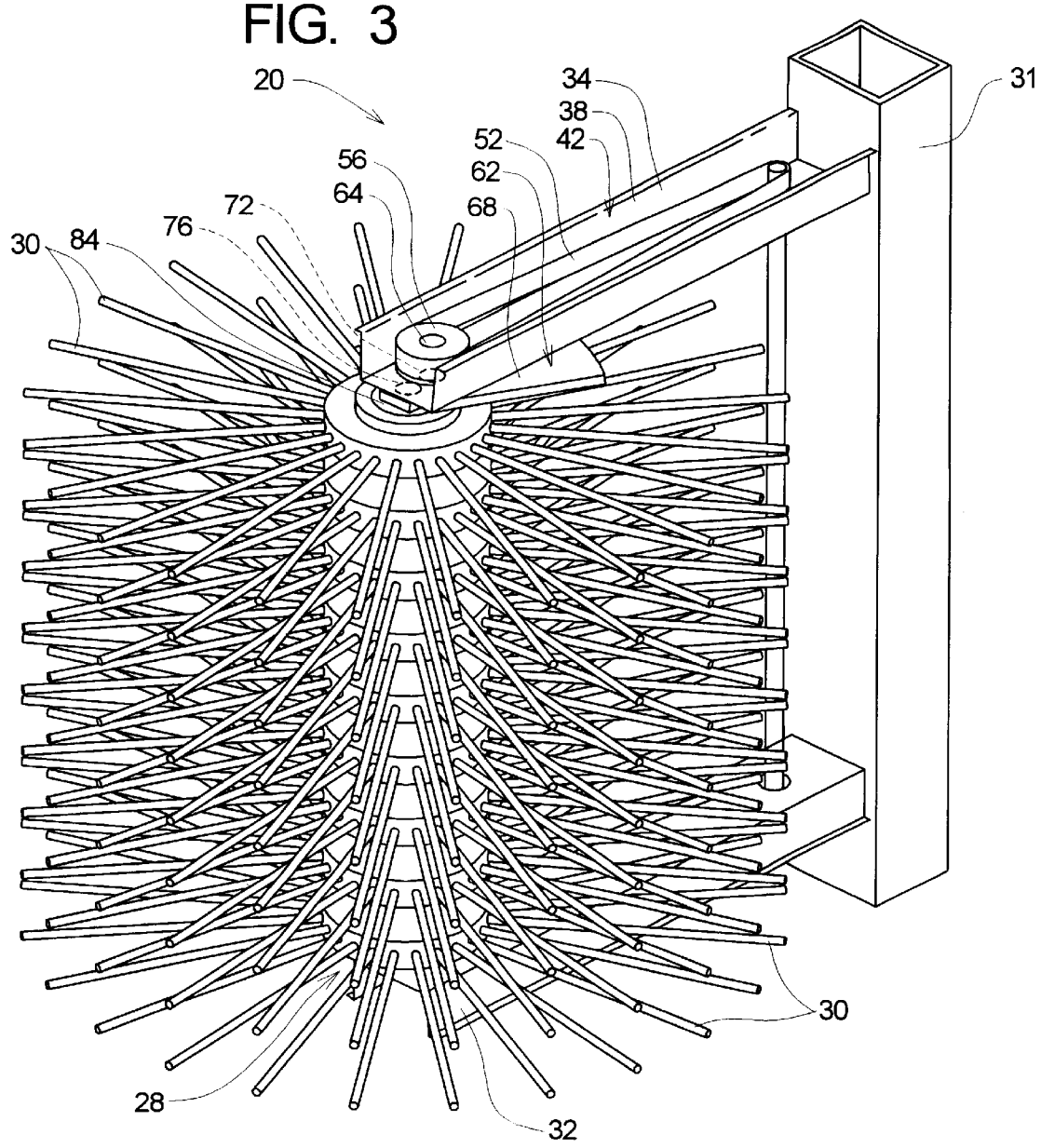
FIG. 3 is bottom section view of the plant engaging system of FIG. 1.
Figure 4:
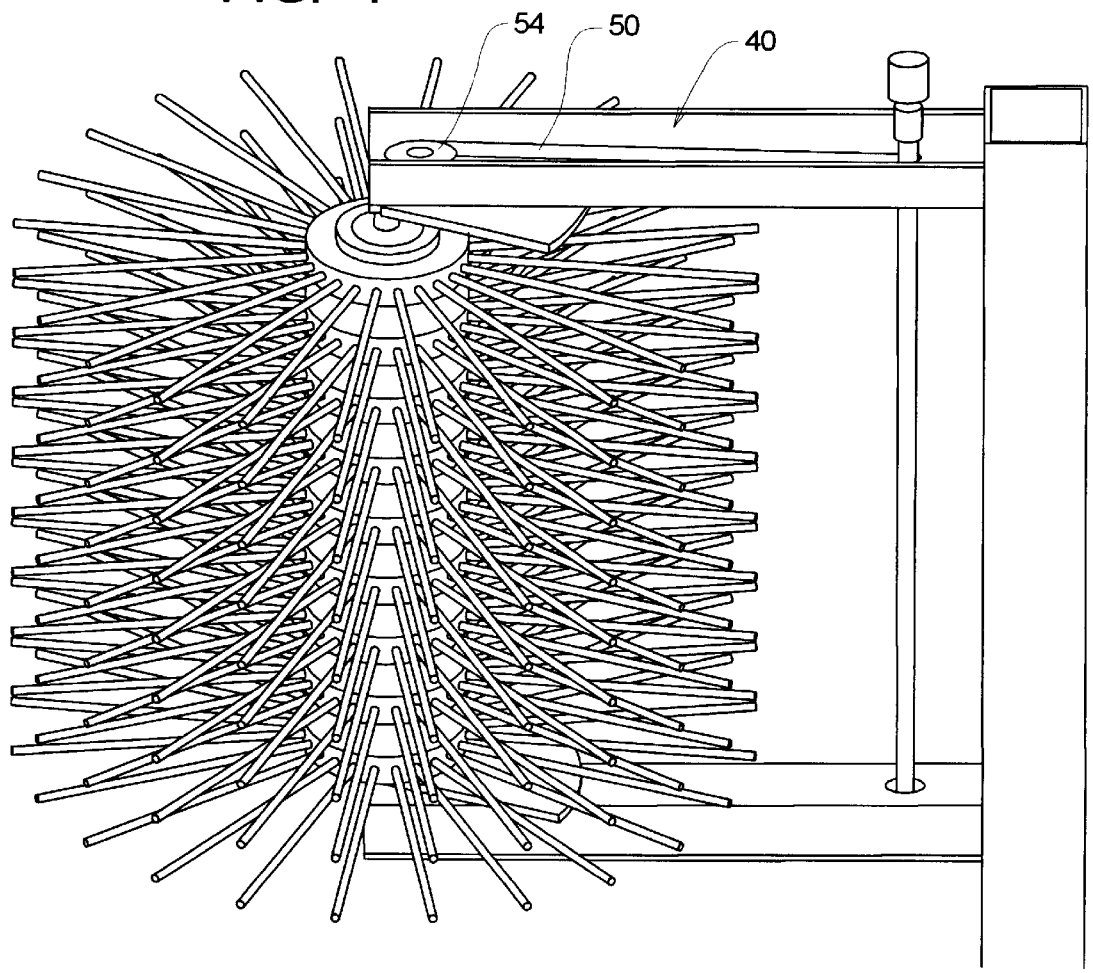
FIG. 4 is a side elevation view of the plant engaging system of FIG. 1.

The present invention is a plant engaging system for a harvesting machine. The plant engaging systems of the present invention may be embodied in a number of different forms, and two exemplary embodiments of plant engaging systems embodying, and constructed in accordance with, the principles of the present invention will be described in detail herein. Following the discussions of the beater rod systems will be discussions of harvesting machines that use either or both of the two exemplary beater rod systems.

I. First Exemplary Plant Engaging System

Depicted at 20 in FIGS. 1–4 of the drawing is a first embodiment of a plant engaging system for a harvesting machine constructed in accordance with, and embodying, the principles of the present invention.

The exemplary plant engaging system 20 comprises a rigid frame assembly 22, a transmission system 24, a counterweight system 26, a drum or engaging assembly 28, and a plurality of beater rods 30 radially extending from the drum assembly 28.

The frame assembly 22 comprises a parallel member 30 and first and second lateral members 32 and 34 that extend from the parallel member 30. Preferably, the lateral members 32 and 34 extend at a right angle from the parallel member 30. The parallel member 30 is a hollow rectangular tube. The lateral members 32 and 34 are U-shaped in cross-section and thus have open sides that define first and second lateral channels 36 and 38. The lateral members 32 and 34 are welded to the parallel member 30 such that the first and second lateral channels 36 and 38 face in opposite directions.

The transmission system 24 preferably comprises first and second transmission assemblies 40 and 42, a drive shaft 44, and a power take-off assembly 46. The first transmission assembly 40 resides in the first lateral channel 36, while the second transmission assembly 42 resides in the second lateral channel 38.

The power take-off assembly 46 is operatively connected to the drive shaft 44. The drive shaft 44 extends between the first and second lateral channels 36 and 38 and is operatively connected to the first and second transmission assemblies 40 and 42. The power take-off assembly 46 is in turn operatively connected to a motor (not shown) that generates rotational motion such that operation of the motor causes axial rotation of the drive shaft 44 about a drive axis A.

The transmission assemblies 40 and 42 each comprise a drive belt 50, 52 and a drive pulley 52, 54. The pulleys 52 and 54 are operatively connected, as will be described in detail below, to the counterweight system 26 such that the pulleys 52 and 54 rotate about a reference axis B that is parallel to, and spaced a distance at least greater than the lengths of the beater rods 28 from, the drive axis A. The reference axis B is defined by the rigid frame assembly 22.

The drive belts 50 and 52 extend between the drive shaft 44 and the pulleys 52 and 54 such that axial rotation of the drive shaft 44 causes balanced rotation of the pulleys 52 and 54 about the reference axis B.

The counterweight system 26 comprises first and second counterweight members 60 and 62 that each comprise a shaft portion 62, 64 and an eccentric portion 66, 68. The shaft portions 62 and 64 are aligned with the reference axis B and are rigidly connected to the pulleys 52 and 54, respectively, through mounting holes 70 and 72 formed in the lateral members 32 and 34. Balanced rotation of the pulleys 52 and 54 about the reference axis B causes revolution of the eccentric portions 66 and 68 about the axis B.

First and second offset holes 74 and 76 are formed in the eccentric portions 66 and 68. The offset holes 74 and 76 are spaced on an opposite side of the shaft portions 62 and 64 from the centers of gravity of the eccentric portions 66 and 68. In the exemplary system 20, the centers of gravity of the eccentric portions 66 and 68 are spaced the same distance from reference plane B as the offset holes 74 and 76. The offset holes 74 and 76 allow the counterweight members 60 and 62 to be operatively connected to the drum assembly 28 as will be described in detail below.

The eccentric portions 66 and 68 have a center of gravity COG offset from the shaft portions 62 and 64. Accordingly, the counterweight members 60 and 62 rotate about the reference axis B in an unbalanced fashion. The offset holes 74 and 76 are spaced from the reference axis B and thus traverse a circular path centered about the reference axis B.

The drum assembly 28 comprises a drum member 80 and first and second bearing assemblies 82 and 84. The drum member 80 is a cylindrical member defining a drum or engaging axis C. The drum member 80 is or may be conventional in that it is adapted to support the beater rods 30 such that they extend radially outwardly from the drum axis C.

Each of the bearing assemblies 82 and 84 has a bearing shaft 86, 88. The bearing assemblies 82 and 84 are mounted to the ends of the drum member 80 such that the bearing shafts 86 and 88 extend outwardly along the drum axis C.

The bearing shafts 86 and 88 are rigidly connected to the offset holes 74 and 76 formed in the counterweight members 60 and 62 such that these holes 74 and 76 are aligned with the drum axis C and the drum axis C is substantially parallel to the reference axis B. Accordingly, a path D traversed by the drum axis C defines a cylinder centered about the reference axis B and having a diameter equal to the distance between the reference and drum axes B and C.

The bearing assemblies 82 and 84 support the drum member in a manner that allows rotational movement of the drum member 80 relative to the bearing shafts 86 and 88. Thus, as the drum axis C revolves about the reference axis B, the drum member 80 itself is free to rotate about the drum axis C.

In use, the plant engaging system 20 is mounted on a carriage of a harvesting machine such that the plant engaging system moves along the row of plants to be harvested. The frame assembly 22 will normally be supported such that the axes A, B, and C described above are generally vertical.

Operation of the motor connected to the power take-off assembly 46 causes the drive shaft 44 to rotate, which in turn causes the drive belts 50 and 52 to rotate the drive pulleys 52 and 54. Rotation of the drive pulleys 52 and 54 is transferred to the counterweight members 60 and 62 through the shaft portions 62 and 64 thereof. The eccentric portions 66 and 68 revolve such that the offset holes 74 and 76 carry the bearing shafts, and thus the drum assembly 28, in a circular path D about the reference axis B.

Additionally, the eccentric portions 66 and 68 will be sized, dimensioned, and located relative to the drum assembly 28 such that revolution of the drum assembly 28 about the reference axis B is balanced by revolution of the eccentric portions 66 and 68.

In use, the beater rods 30 are displaced along the row of plants to be harvested by a conventional carriage assembly (not shown), while at the same time the beater rods 30 will move with the drum assembly 28 along its circular path. The composite movement of the beater rods 30 will contact the plants and dislodge the produce thereon.

The contact between the beater rods 30 and the plants will cause the drum assembly 28 to rotate about the drum axis C relative to the counterweight members 60 and 62 so that a given beater rod will normally oscillate adjacent to one portion of the plant as the plant engaging system moves relative to the plant.

While the foregoing plant engaging system 20 is believed to be optimum, a number of variations thereon can be employed depending upon such factors as cost, weight, and the characteristics of the crop being harvested.

For example, a braking system may be provided to prevent movement of the drum assembly 28 relative to the counterweight members 60 and 62 about the drum axis C. If the drum assembly is not free to rotate about the drum axis C, the beating action imparted to the plant will be more aggressive; in addition to oscillating, the beater rod will swing through the plant being harvested. For certain plants, this more aggressive beating action may be appropriate. Alternatively, instead of freely rotating as described in the exemplary plant engaging system 20, the drum assembly 28 may be actively rotated about the drum axis C to alter the beating action on the plant.

In certain circumstances, cost savings may be obtained by using only one transmission assembly rather than the two transmission assemblies 40 and 42 described above.

The beater rods 30 may be spring loaded or attached to the drum assembly 28 such that they can move along their longitudinal axes towards the drum axis C.

A housing will normally be provided around the upper ends of the drum assembly 28 and the counterweight members 60 and 62 to prevent unintentional contact therewith.

II. Second Exemplary Plant Engaging System

Figure 5:
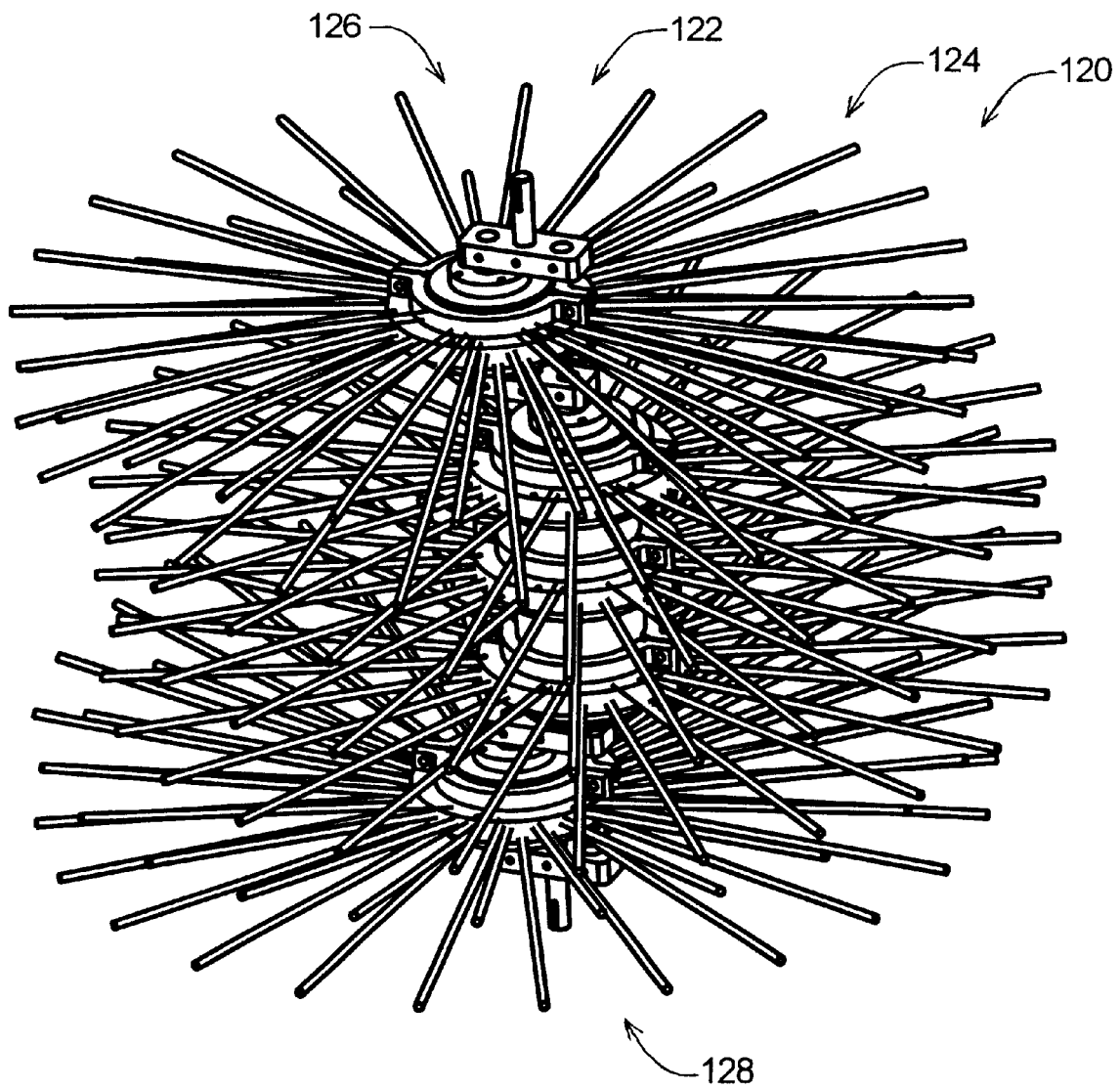
FIG. 5 is a perspective view of a second embodiment of a plant engaging system of the present invention.
Figure 6:
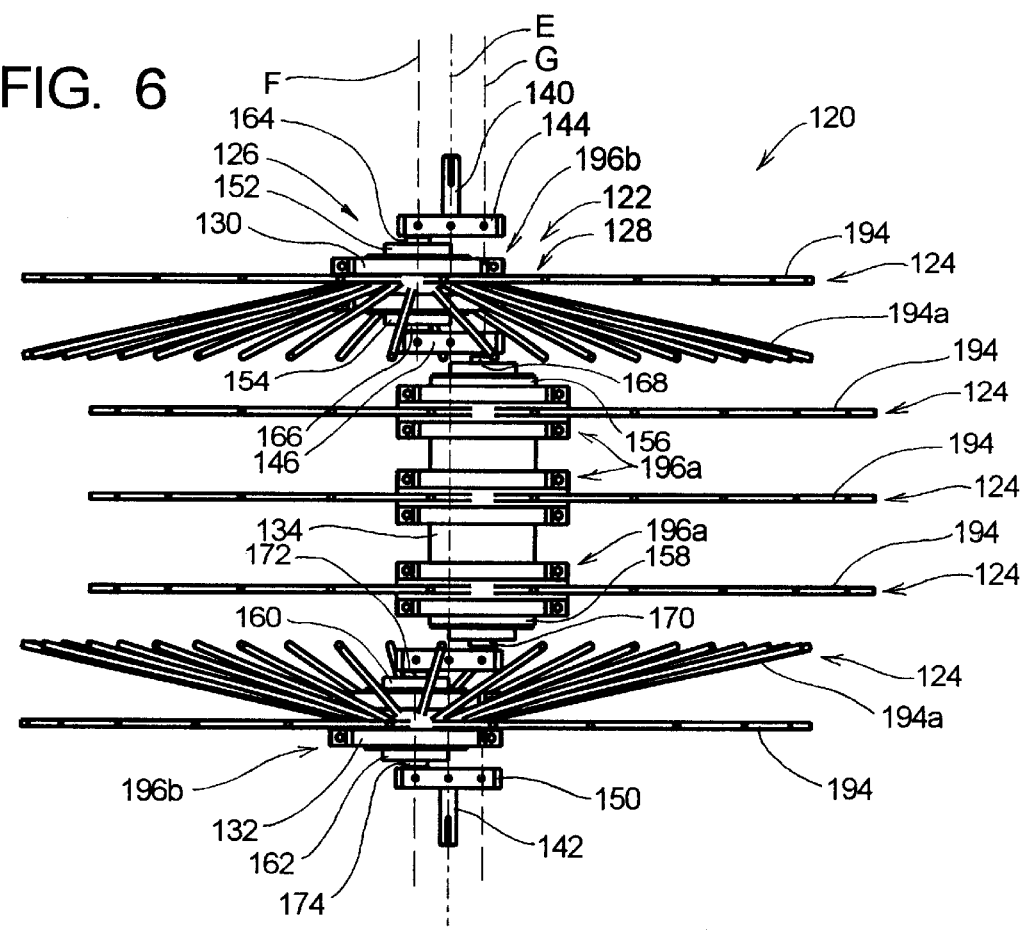
FIG. 6 is a front elevation view of the plant engaging system of FIG. 5.
Figure 7:
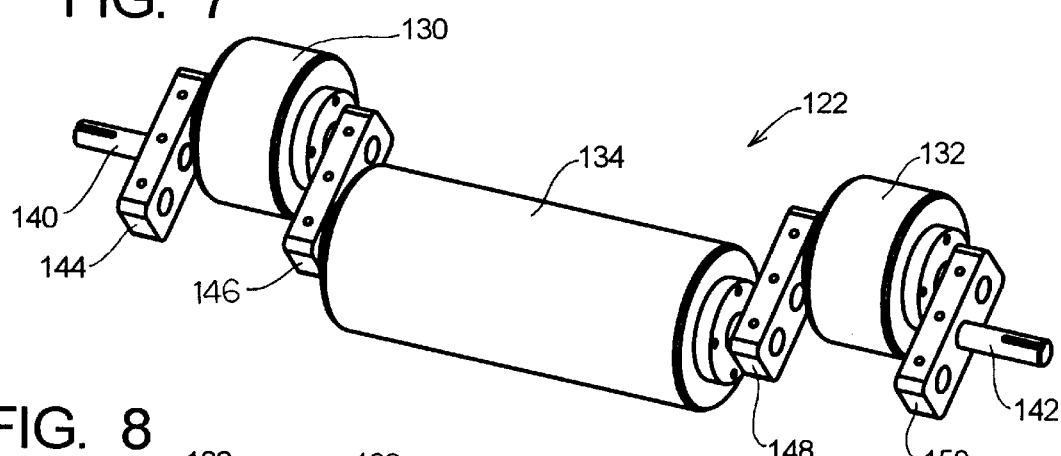
FIG. 7 is a perspective view of a drum assembly of the plant engaging system of FIG. 5.

Depicted at 120 in FIGS. 5–7 of the drawing is a second embodiment of a plant engaging system for a harvesting machine constructed in accordance with, and embodying, the principles of the present invention.

Like the plant engaging system 20 described above, the exemplary plant engaging system 120 comprises a rigid frame assembly, a transmission system, a drum or engaging assembly 122, and a plurality of beater rods 124 radially extending from the drum assembly 22. The rigid frame assembly and transmission system are not shown in FIGS. 5–7, and the rigid frame assembly 22 and transmission system 24 described above may be used with the plant engaging system 120.

The plant engaging system 120 does not require the use of a counterweight member such as the counterweight members 60 and 62 used by the counterweight system 26 employed by the plant engaging system 20. Instead, the exemplary drum assembly 122 comprises first and second sets 126 and 128 of drum members. As shown in FIG. 7, the exemplary first set 126 comprises an upper drum member 130 and a lower drum member 132, while the exemplary second set 128 employs a middle drum member 134. The beater rod assemblies 124 generally radially extend from the drum members 130, 132, and 134. In effect, the sets 126 and 128 of drum members act as a counterweight for each other; therefor, with reference to one of these sets of drum members, the other set of drum members (with its associated beater rod assemblies) may be considered a counterweight assembly.

The frame assembly that supports the exemplary drum assembly 122 defines a reference axis E; the drum assembly 122 defines first and second drum axes F and G (FIG. 6). As with the reference axis B described above, the reference axis E is defined by the rigid frame assembly (not shown) employed by the plant engaging system 120. The upper and lower drum members 130 and 132 of the first set 126 are aligned along a first drum or engaging axis F, while the middle drum member 134 of the second set 128 is aligned along a second drum axis G.

The exemplary drum axes F and G are substantially parallel to each other and to the reference axis E. The distance between the first drum axis F and the reference axis E will be defined as the length of line segment EF extending between the axes E and F, while the distance between the first drum axis G and the reference axis E will be defined as the length of line segment EG extending between the axes E and G.

As with the exemplary plant engaging system 20 described above, the transmission system of the exemplary plant engaging system 120 moves the drum assembly 122 such that the beater rod assemblies 124 oscillate towards and away from the plant being harvested. The beater rod assemblies 124 that are aligned such that they extend into the plant being harvested will thus contact the plant in such a manner that produce thereon falls for collection.

As generally discussed above, the use of a plurality of sets of drum members that are spaced along parallel drum axes parallel to and spaced from the reference axis E may obviate the need for a counterweight system as described in the first exemplary plant engaging system 20. The drum members 130–134, and the beater rod assemblies 124 that extend therefrom, are designed and spaced from the reference axis E such that the loads created by revolution of the drum members 130–134 (and beater rod assemblies 124) about the reference axis E are balanced.

In particular, as perhaps best shown in FIG. 6, the drum axes F and G are equally spaced on opposite sides of the reference axis E. In other words, the length of the line segment EF equals the length of the line segment EG and the angle between these line segments EF and EG is approximately 180°. In addition, the weight of the exemplary drum members 130 and 132, plus the beater rod assemblies 124 carried thereby, is approximately the same as the combined weight of the drum member 134 and the beater rod assemblies 124 carried thereby.

Each of the sets 126 and 128 of drum members acts as a counterbalance for the other set. Accordingly, the use of balanced sets of drum members may obviate the need for a separate counterbalance member as is used by the plant engaging system 120 described above.

Other arrangements of the drum axes relative to the reference axis are possible. For example, more than two sets of drum members may be employed, in which case the drum axes defined by these sets may be spaced at angles of less than 180° from each other about the reference axis. In the case of three equal weight, evenly spaced sets of drum members, the angular spacing may be 120°.

As another example, if the combined weight of the drum members in two sets cannot be made substantially the same, the drum axes may be spaced on opposite sides of and at different distances from the reference axis E to compensate for the unbalanced weights. Alternatively, if the weights of the drum members in the separate sets of drum members can not be made to completely balance each other, a separate counterweight member similar to the counterweight members 60 or 62 described above may be sized, dimensioned, and located relative to the drum axes F and G to ensure balanced operation of the drum assembly 128.

In the exemplary plant engaging system 120, the middle drum member 134 is spaced between the upper and lower drum members 130 and 132 when their respective positions are projected onto the reference axis E. Other arrangements of drum members in the sets of drum members are possible, however. For example, the first and second sets may each comprise two drum members whose projections alternate from set to set along the reference axis E (e.g., first drum member of first set on top, first drum member of second set next, second drum member of first set next, and second drum member of second set on bottom).

In any event, a plant engaging system employing the principles of the present invention may use one or more of these variations on the plant engaging system 120 described in detail herein.

The construction and operation of the exemplary plant engaging system 120 will now be described in further detail.

As best shown in FIGS. 6 and 7, the plant engaging system 120 further comprises first and second main shaft members 140 and 142, first, second, third, and fourth offset members 144, 146, 148, and 150, and first, second, third, fourth, fifth, and sixth bearing assemblies 152, 154, 156, 158, 160, and 162. The first through sixth the bearing assemblies 152–162 define first, second, third, fourth, fifth, and sixth bearing shafts 164, 166, 168, 170, 172, and 174. The bearing assemblies 152–162 are conventional and allow the bearing shafts 164–174 to freely rotate relative to the member to which the bearing assemblies 152–162 are attached.

The first and second bearing assemblies 152 and 154 are mounted on the ends of the upper drum member 130 such that the first and second bearing shafts 164 and 166 are aligned with the longitudinal axis of the drum member 130. The third and fourth bearing assemblies 156 and 158 are mounted on the ends of the middle drum member 134 such that the third and fourth bearing shafts 168 and 170 are aligned with the longitudinal axis of the drum member 134. The fifth and sixth bearing assemblies 160 and 162 are mounted on the ends of the lower drum member 132 such that the fifth and sixth bearing shafts 172 and 174 are aligned with the longitudinal axis of the drum member 132.

Figure 8:
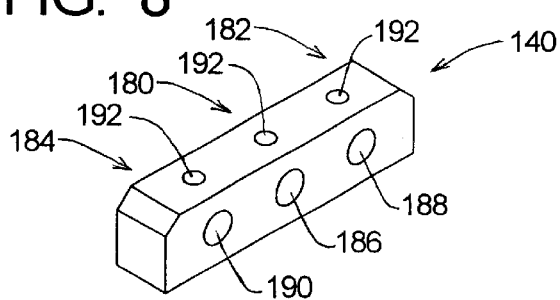
FIG. 8 is a perspective view of an offset member employed by the drum assembly of FIG. 7.

As perhaps best shown in FIG. 8, the exemplary offset members 144–150 are rigid metal elongate members each having a central portion 180 and first and second end portions 182 and 184. Central, first end, and second end through holes 186, 188, and 190 are formed in the central and first and second end portions 180–184, respectively, of the offset members 144–150. Threaded fastening holes 192 are associated with each of the through holes 186–190 to allow a cylindrical member inserted into the through holes 186–190 to be fixedly secured to the offset members 144–150. For purposes of clarity, the central and end portions 180–184 are not identified by reference characters in FIGS. 6 and 7 or in the following text discussing these figures.

The exemplary offset members 144–150 are sized and dimensioned for ease of manufacture and to bear the loads introduced thereon. However, the details of construction and operation of the offset members are not essential to any implementation of the present invention in other embodiments, and other designs may be used. For example, the offset members may be made in other shapes such as discs.

The first main shaft member 140 is rigidly attached to the central portion of the first offset member 144 such that the rotation of the shaft member 140 is imparted to the first offset member 144. In the exemplary system 120, the first main shaft member 140 is aligned with the reference axis E such that the first offset member 144 rotates symmetrically about the reference axis E. The second main shaft member 142 is also aligned with the reference axis E and is similarly attached to the central portion of the fourth offset member 150.

The first bearing shaft 164 is attached to the first end portion of the first offset member 144 such that the upper drum member 130 may rotate relative to the first offset member 144. The second bearing shaft 166 is rigidly connected to the first end portion of the second offset member 146 such that the upper drum member 130 also rotates relative to the second offset member 146.

The third bearing shaft 168 is rigidly connected to the second end portion of the second offset member 146 such that the middle drum member 134 rotates relative to the second offset member 146. The fourth bearing shaft 170 is attached to the first end portion of the third offset member 148 such that the middle drum member 130 may rotate relative to the third offset member 148.

The fifth bearing shaft 170 is rigidly connected to the second end portion of the third offset member 148 such that the lower drum member 132 rotates relative to the third offset member 148. The sixth bearing shaft 172 is rigidly connected to the first end portion of the fourth offset member 150 such that the lower drum member 132 rotates relative to the fourth offset member 150.

When the various connections between the bearing shafts and offset members described above are made, and the first and second main shaft members 140 and 142 are correctly supported along the reference axis E by the frame assembly, the central through holes 186 of the offset members 144–150 are aligned with the reference axis E, the first end through holes 188 of the offset members 144–150 are aligned with the first drum axis F, and the second end through holes 190 of the offset members 144–150 are aligned with the second drum axis G. The bearing shafts 164, 166, 172, and 174 are aligned with the first drum axis F, while the bearing shafts 168 and 170 are aligned with the second drum axis G.

Accordingly, by rotating the first and second main shaft portions 140 and 142 in the same direction, the drum members 130–134 will follow a circular path centered about the reference axis E; this circular path has a diameter equal to the length of the line segments EF and EG. In addition to revolving about the reference axis E, these drum members will freely rotate about their respective drum axes F or G.

The offset drum arrangement described herein may be obtained using other structural arrangements, such as a single, unitary casting or assembly, instead of separate offset members. The structural elements described herein that obtain this offset drum arrangement are thus not essential to any given implementation of the present invention.

The beater rod assemblies 124 each comprise a plurality of beater rods 194 and a rod clamp assembly 196 that secures the rods 194 onto one of the drum members 130–134. The beater rods 194 are or may be conventional and will not be described herein in detail.

The rod clamp assemblies 196 are of a first type identified by reference character 196a and associated with the middle drum member 134 and a second type identified by reference character 196b and associated with the upper and lower drum members 130 and 132. The first type of rod clamp assembly 196a is conventional and supports the beater rods 194 in a plane that is substantially perpendicular to the reference axis E.

As shown in FIG. 6, the second type of rod clamp assembly 196b is generally conventional but supports at least some of the rods 194 in a plane perpendicular to the reference axis E and some of these rods 194a at an angle of less than 90° with respect to the reference axis E. The rod clamp assemblies 196b are arranged on the upper and lower drums 130 and 132 such that the angled rods 194a extend beater rod coverage to what would otherwise be coverage gaps between the middle drum 134 and the upper and lower drums 130 and 132.

The potential coverage gaps in the system 120 are created by the structure employed to offset the middle drum member 134 from the upper and lower drum members 130 and 132.

Other structures may not create these coverage gaps, and the present invention may be embodied without angled rods with other structural arrangements.

III. Third Exemplary Plant Engaging System

The present invention may also be embodied as a third exemplary plant engaging system that is similar to the first and second plant engaging systems described above. The third exemplary plant engaging system will be described herein only to the extent that it differs from previously described plant engaging systems.

The third exemplary plant engaging system is optimized for harvesting produce from plants that are generally horizontally arranged. For example, raisins are often harvested from grape plants that grow along horizontally extending wires extending between vertical posts. The grapevines grow vertically along the posts and then horizontally along the wires. As an alternative, the grapevines grow up a vertical post and then out along generally horizontal posts extending from the vertical post. In either configuration, the grapes hang in clusters from generally or substantially horizontally extending vines.

After the grapes mature, the grapevines are cut, preferably at the top of the vertical post, such that the grapes are deprived of fluid. After the grapes dry to form raisins, the raisins are harvested from the grape vines.

The third plant engaging system is substantially differs from the first and second plant engaging systems in that: (1) the third plant engaging system is mounted such that its reference axis is generally horizontal (parallel to the horizontal wire or post); (2) the beater rods 194 may be omitted; (3) and the bearing assemblies 152–162 may be omitted.

Accordingly, in one form the third plant engaging system would be substantially as depicted in FIG. 7. The drums 130, 132, and 134 thus form engaging members that revolve about the horizontally aligned reference axis and directly engage the plant to dislodge the produce. The single drum of the first plant engaging system could be used in an alternate arrangement.

IV. First Exemplary Harvesting System

Figure 9:
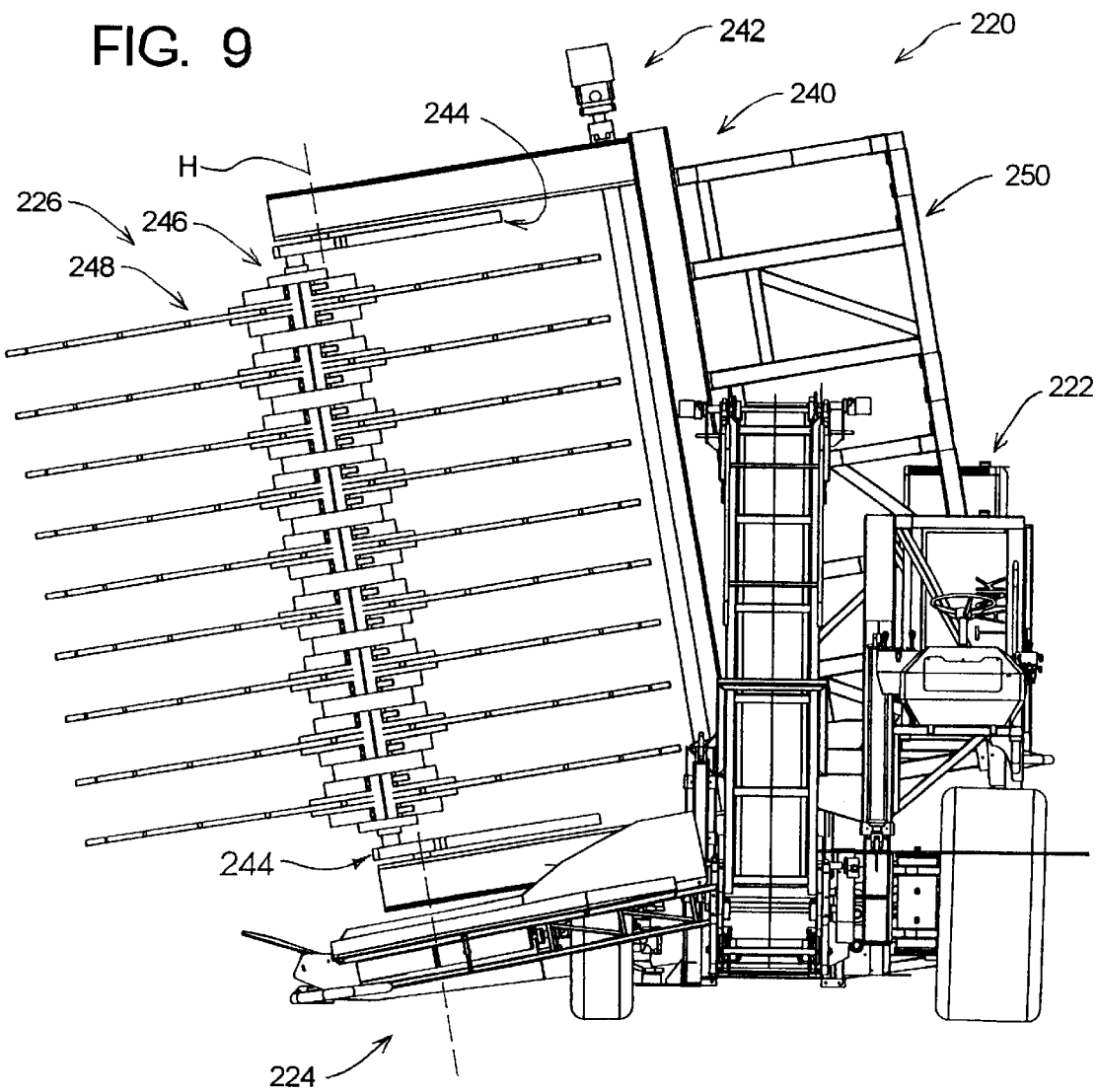
FIG. 9 is a front elevation view of a first embodiment of a harvesting system employing a plant engaging system constructed in accordance with, and embodying, the principles of the present invention.

Referring now to FIG. 9, depicted therein at 220 is a harvesting system constructed in accordance with, and embodying, the principles of the present invention. The harvesting system 220 comprises a vehicle platform 222, a collecting system 224, and a plant engaging system 226.

The vehicle platform 222 is designed to support the collecting system 224 and the plant engaging system 226; the details of design and construction of the vehicle platform are not crucial to any implementation of the present invention, and vehicle platforms having widely diverse characteristics may be used. For example, the vehicle platform may be a self-propelled vehicle, as in the case of the exemplary vehicle platform 222, or it may be a trailer designed to be pulled behind a truck or tractor. The most important characteristics of the vehicle platform are that it is stable and structurally sound enough to support the collecting system 224 and plant engaging system 226 as described herein.

The collecting system 224 comprises a collecting platform 230 that is supported below the plant from which produce is to be harvested as the plant engaging system 226 engages and jostles the plant; produce dislodged from the plant will thus fall onto the collecting platform 230. Produce dislodged from the plant in this manner may be allowed simply to fall for collection by hand, but a collecting system fully automates the harvesting process and is thus desirable. The collecting system is or may be conventional, and the exemplary collecting system 226 thus will not be described herein in detail.

The exemplary plant engaging system 226 comprises a rigid frame assembly 240, a transmission system 242, a counterweight system 244, a drum assembly 246, and a plurality of beater rod assemblies 248 radially extending from the drum assembly 246. The plant engaging system 226 used by the exemplary harvesting system 220 is substantially the same as the plant engaging system 20 described above, and the construction and operation of the plant engaging system 226 thus will not be described in detail again.

The rigid frame assembly 240 is supported on a movable frame 250 supported by the vehicle platform 222. Indicated at H in FIG. 9 is the reference axis of the plant engaging system 226. The reference axis H is defined by, and is thus fixed relative to, the rigid frame assembly 240. The movable frame 250 is movable relative to the platform 222 such that the angle of the reference axis H relative to true vertical may be changed. The movable frame 250 allows the reference axis H to be made vertical if the ground over which the vehicle platform 222 is traversing is not horizontal and also allows the reference axis H to be tilted when required by harvesting conditions. The design, construction, and operation of the movable frame 250 are well within the capabilities of one of ordinary skill in the art.

V. Second Exemplary Harvesting System

Figure 10:
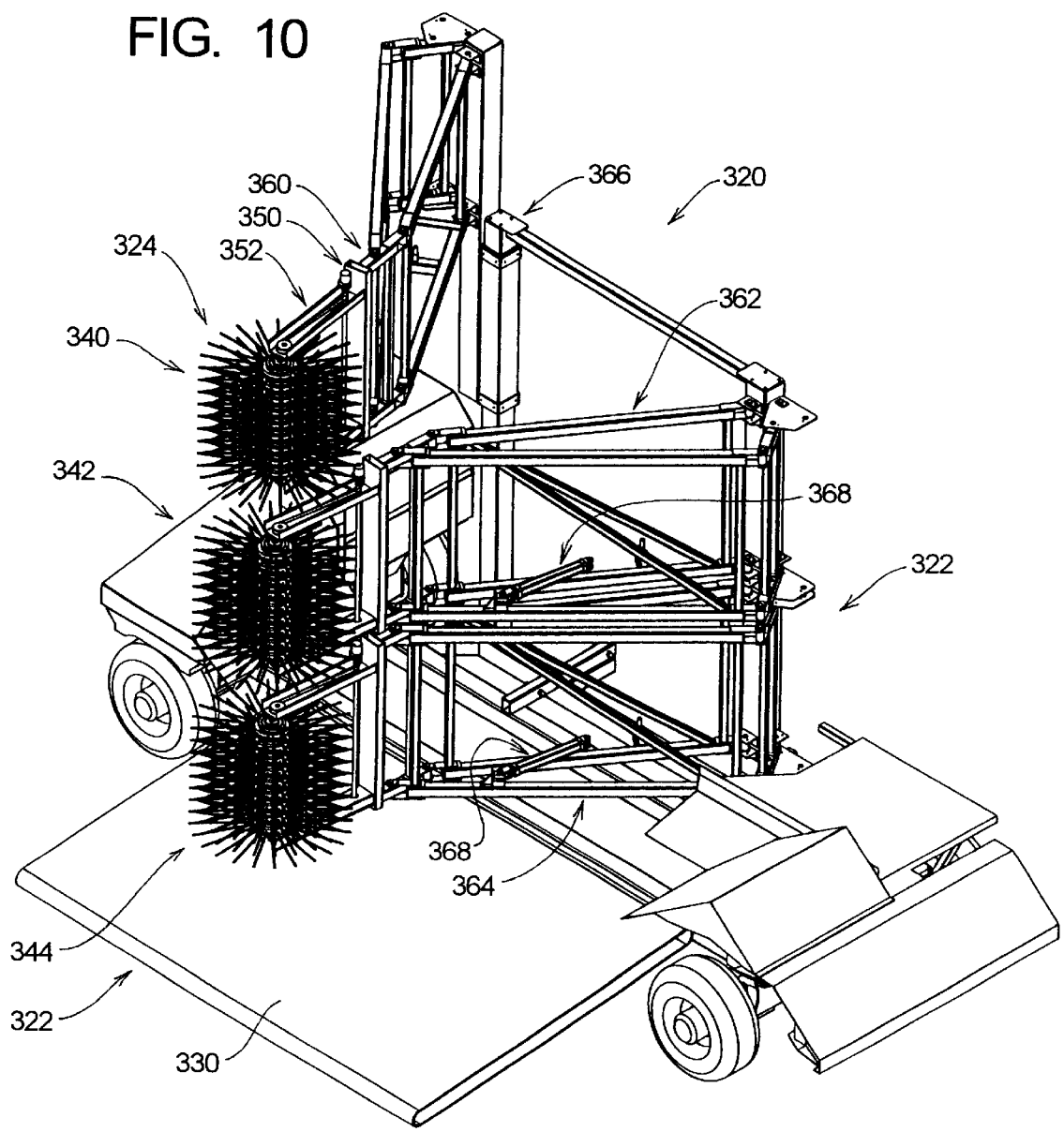
FIG. 10 is a perspective view of a first embodiment of a harvesting system employing a plant engaging system constructed in accordance with, and embodying, the principles of the present invention.
Figure 11:
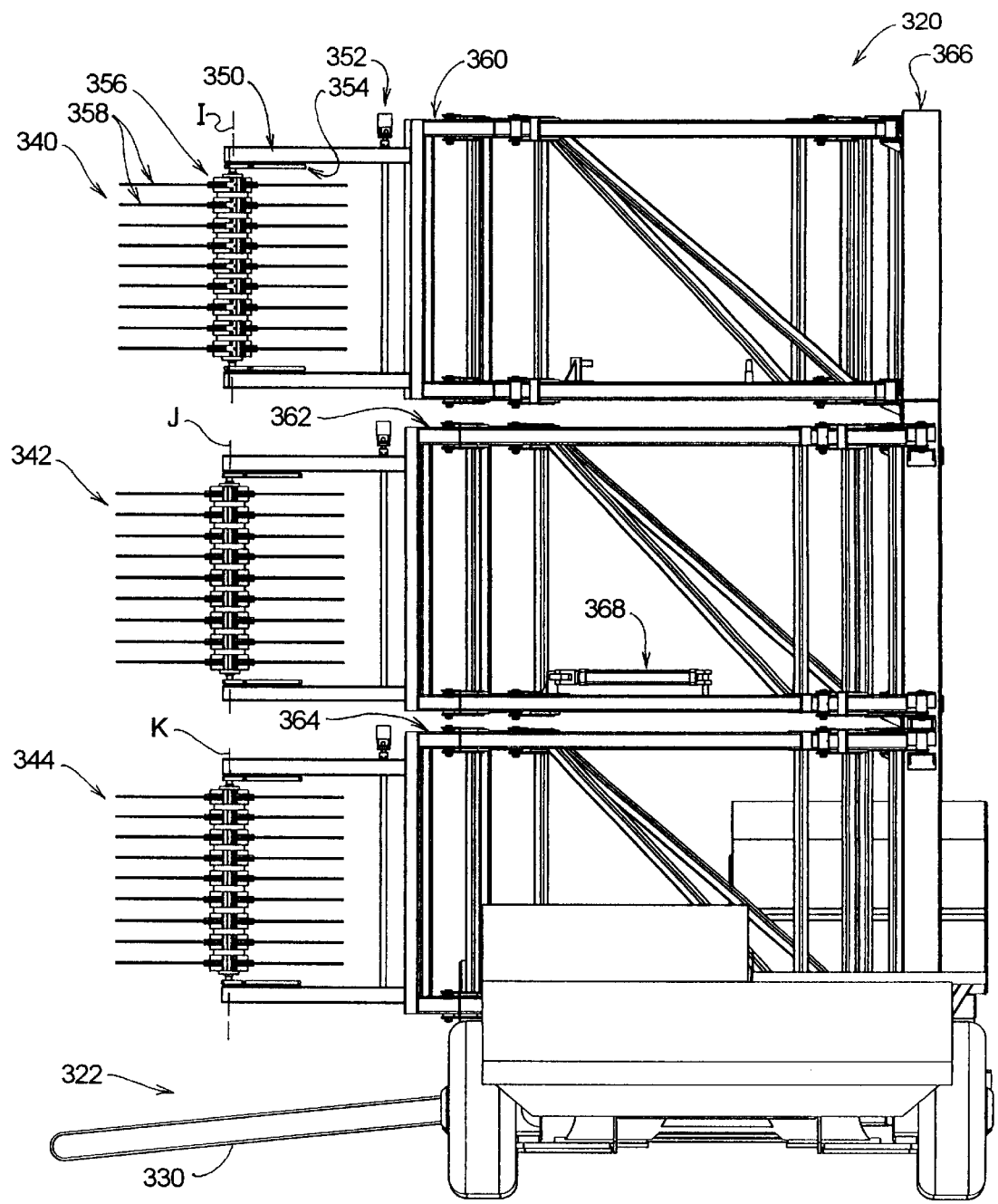
FIG. 11 is front elevation view of a first embodiment of a harvesting system employing a plant engaging system constructed in accordance with, and embodying, the principles of the present invention.

Referring now to FIGS. 10 and 11, depicted therein at 320 is a second exemplary harvesting system constructed in accordance with, and embodying, the principles of the present invention. The harvesting system 320 comprises a vehicle platform 322, a collecting system 324, and a plant engaging system 326.

The vehicle platform 322 is designed to support the collecting system 324 and the plant engaging system 326. Again, the details of design and construction of the vehicle platform are not crucial to any implementation of the present invention, and vehicle platforms having widely diverse characteristics may be used. Practically speaking, the primary difference between the vehicle platform 222 described above and the vehicle platform 322 is that the load carrying capacity of the platform 322 is significantly greater than the platform 222, for reasons that will become clear from the following discussion.

Like the collecting system 224, the collecting system 324 comprises a collecting platform 330 onto which produce dislodged from the plant will fall when dislodged by the plant engaging system 226. The exemplary collecting system 324 also is or may be conventional and thus will also not be described herein in detail.

The exemplary plant engaging system 326 comprises three modular beater units 340, 342, and 344. Each of the beater units comprises a rigid frame assembly 350, a transmission system 352, a counterweight system 354, a drum assembly 356, and a plurality of beater rod assemblies 358 radially extending from the drum assembly 356. The beater units 340, 342, and 344 used by the exemplary harvesting system 320 are substantially the same as the plant engaging system 20 described above, and the construction and operation of the beater units 340, 342, and 344 thus will not be described in detail again.

The rigid frame assemblies 350 are supported on movable frames 360, 362, and 364 mounted on a fixed frame 366 extending upwardly from the vehicle platform 322. The beater units 340, 342, and 344 define first, second, and third reference axes I, J, and K. In particular, the rigid frame assemblies 350 associated with the beater units 340, 342, and 344 define the reference axes I, J, and K, respectively.

The movable frames 360, 362, and 364 are movable relative to the fixed frame 366 such that the reference axes I, J, and K can be moved, independent from each other, relative to the vehicle platform 322. A hydraulic or electric actuator system 368 is associated with each of movable frames 360, 362, and 364 to allow the movement of these frames to be remotely and independently controlled.

The movable frames 260, 262, and 264 thus allow the beater units 340, 342, and 344 to be configured as necessary to conform to the shape, height, density, and/or other characteristic of a particular tree being harvested. For example, the branches of a first tree may be longer than the next tree in the row. Accordingly, the beater units 340, 342, and 344 may be retracted (towards the fixed frame 366) while harvesting the first tree and then extended (away from the fixed frame 366) while harvesting the second tree.

VI. Additional Exemplary Harvesting Systems

In the preceding discussions of the harvesting systems 220 and 320, the plant engaging systems 226 and 326 were formed by using one or more plant engaging systems such as the plant engaging system 20 described above. It should be apparent that one or more of the plant engaging systems 120 as described above could be used to form the plant engaging systems 226 and/or 326, and in some situations a multiple beater unit harvesting system, such as the harvesting system 320, may be formed of some combination of plant engaging systems 20 and 120.

In addition, a harvesting system may be developed that uses a plurality of modular beater units that are spaced from each other in the direction of travel of the vehicle platform and/or vertically stacked as in the case of the harvesting system 320.

It is to be recognized that various modifications could be made to the present invention without departing from the basic teachings thereof. Accordingly, the scope of the present invention should be determined by the following claims and not the foregoing preferred embodiments.

What is claimed is:

1. A plant engaging system for harvesting produce from plants comprising:
   a plurality of rigid frame assemblies, where each rigid frame assembly defines a reference axis;
   an engaging assembly mounted on each of the rigid frames, where each engaging assembly comprises at least one engaging member, where each engaging member defines an engaging axis and the engaging assemblies are supported by the rigid frames such that the engaging axes are parallel to and spaced a first offset distance from the reference axes;
   a plurality of counterweight assemblies each having a center of gravity, where the counterweight assemblies are supported by the rigid frames such that the centers of gravity are spaced a second offset distance from the reference axis;
   a rotation system for causing the engaging members and the counterweight assemblies to revolve around the reference axes; whereby
   revolution of the engaging members about the reference axes causes the engaging members to engage the plant to dislodge produce from the plant.

2. A plant engaging system as recited in claim 1, in which each engaging assembly further comprises at least one rod member extending from the engaging member, where the engaging members indirectly engage the plant through the at least one rod member to dislodge produce from the plant.

3. A plant engaging system as recited in claim 1, in which the engaging members directly engage the plant to dislodge produce from the plant.

4. A plant engaging system as recited in claim 1, in which each counterweight assembly comprises at least one counterweight member.

5. A plant engaging system as recited in claim 1, in which the counterweight assemblies each comprise first and second counterweight members.

6. A plant engaging system as recited in claim 1, in which the counterweight assemblies each comprise a second engaging assembly comprising at least one engaging member.

7. A plant engaging system as recited in claim 6, in which each counterweight assembly further comprises a counterweight member.

8. A plant engaging system as recited in claim 6, in which the second engaging assemblies each define a second engaging axis that extends through the center of gravity of the counterweight assembly and is parallel to the reference axis.

9. A plant engaging system as recited in claim 8, in which the first and second offset distances are equal.

10. A plant engaging system as recited in claim 1, in which the engaging members each travel along a circular path centered about the reference axes.

11. A plant engaging system as recited in claim 1, in which the engaging axes and the centers of gravity of the counterweight assemblies travel along circular paths centered about the reference axis.

12. A method of engaging a plant to dislodge produce from the plant, the method comprising the steps of:
   providing a plurality of rigid frame assemblies each defining a reference axis;
   providing a plurality of plant engaging comprising at least one engaging member;
   mounting each of the engaging assemblies on one of the rigid frame assemblies such that
      the plant engaging members each rotate around the reference axis associated therewith
      at least one of the plurality of rigid frame assemblies is arranged above another of the plurality of rigid frame assemblies such that the plant engaging members engage upper and lower portions of the plant;
   mounting a counterweight assembly on each of the rigid frame assemblies such that a center of gravity of each of the counterweight assemblies revolves around the reference axis associated therewith; and
   causing the engaging members and the counterweight assemblies to revolve about the reference axis associated therewith such that the engaging members contact the plant to dislodge produce from the plant.

13. A method as recited in claim 12, in which the engaging members directly engage the plant to dislodge produce from the plant.

14. A method as recited in claim 12, in which the step of mounting the counterweight assemblies on the rigid frame assemblies further comprises the step of mounting a counterweight member on each of the frame assemblies such that centers of gravity of the counterweight members are arranged to balance the engaging assemblies.

15. A method as recited in claim 12, further comprising the step of mounting at least one rod member to each of the engaging members such that the engaging members indirectly engage the plant through the at least one rod member to dislodge produce from the plant.

16. A harvesting system for harvesting produce from a plant comprising:
   a vehicle platform capable of movement next to the plant;
   a vehicle frame extending from the vehicle platform; and a plurality of plant engaging assemblies, where at least one of the plurality of plant engaging assemblies is arranged above another of the plurality of plant engaging assemblies to engage upper and lower portions of the plant, the plant engaging assemblies each comprising a rigid frame assembly that defines a reference axis, where the rigid frame assembly is supported by the vehicle frame such that the reference axis is arranged to one side of the vehicle platform;

a first engaging assembly comprising at least one engaging member, where the engaging member defines a first engaging axis and the first engaging assembly is supported by the rigid frame such that the first engaging axis is parallel to and spaced a first offset distance from the reference axis;

a counterweight assembly having a center of gravity, where the counterweight assembly is supported by the rigid frame such that the center of gravity is spaced a second offset distance from the reference axis;

a rotation system for causing the at least one engaging member and the counterweight assembly to revolve around the reference axis; whereby the revolution of the engaging members about the reference axes while the vehicle platform moves by the plant causes the engaging members to engage the plant to dislodge produce from the plant.

17. A harvesting system as recited in claim 16, further comprising an actuator system for displacing the rigid frame assemblies relative to the vehicle frame to change a position of the reference axis relative to the vehicle platform.

18. A harvesting system as recited in claim 16, further comprising an actuator system associated with each of the plurality of plant engaging assemblies, where each actuator system allows the rigid frame assemblies to be displaced relative to the vehicle frame to change a position of the reference axes of the plant engaging assemblies relative to the vehicle platform.

19. A plant engaging system as recited in claim 10, in which the engaging assemblies each further comprises at least one rod member extending from the engaging member, where the engaging members indirectly engage the plant through the at least one rod member to dislodge produce from the plant.

20. A plant engaging system as recited in claim 16, in which the engaging members directly engage the plant to dislodge produce from the plant.

21. A plant engaging system as recited in claim 16, in which each of the counterweight assemblies comprises at least one counterweight member.

22. A plant engaging system as recited in claim 16, in which the each of the counterweight assemblies comprises an engaging assembly comprising at least one engaging member.

23. A harvesting system as recited in claim 16, further comprising a collection system for collecting produce dislodged from the plant.

24. A harvesting system as recited in claim 23, in which the collection system further comprises a collection platform at least partly arranged under the plant engaging system such that produce dislodged from the plant falls onto the collection platform.

* * * * *